United States Patent
Cong et al.

(10) Patent No.: US 10,916,207 B1
(45) Date of Patent: Feb. 9, 2021

(54) DYNAMIC IMAGE SPLIT METHOD FOR DUAL CELL LIQUID CRYSTAL DISPLAY, AND CIRCUIT IMPLEMENTING THE SAME

(71) Applicant: NOVATEK MICROELECTRONICS CORP., Hsinchu Science Park (TW)

(72) Inventors: Hong-Chun Cong, Xi'An (CN); Jian-Hua Liang, Xi'An (CN); Xiao Zhang, Xi'An (CN)

(73) Assignee: NOVATEK MICROELECTRONICS CORP., Hsinchu Science Park (TW)

( * ) Notice: Subject to any disclaimer, the term of this patent is extended or adjusted under 35 U.S.C. 154(b) by 0 days.

(21) Appl. No.: 16/664,553

(22) Filed: Oct. 25, 2019

(51) Int. Cl.
  *G09G 5/10* (2006.01)
  *G09G 3/36* (2006.01)
  *G02F 1/1347* (2006.01)

(52) U.S. Cl.
  CPC .............. *G09G 3/36* (2013.01); *G02F 1/1347* (2013.01); *G09G 2320/02* (2013.01); *G09G 2320/066* (2013.01); *G09G 2320/0686* (2013.01)

(58) Field of Classification Search
  CPC ..................... G02F 1/133555; G02F 1/134363
  See application file for complete search history.

(56) References Cited

U.S. PATENT DOCUMENTS

| | | | |
|---|---|---|---|
| 5,872,590 A * | 2/1999 | Aritake | H04N 13/31 348/57 |
| 2013/0106923 A1 * | 5/2013 | Shields | G09G 3/3406 345/690 |

* cited by examiner

*Primary Examiner* — Nan-Ying Yang
(74) *Attorney, Agent, or Firm* — Hamre, Schumann, Mueller & Larson, P.C.

(57) ABSTRACT

A dynamic image split method for a dual cell LCD that includes a back cell and a front cell is proposed to obtain a smoother back-cell image. Multiple desired effective transmittances that correspond to a group of front-cell pixels are taken into consideration in determining a transmittance for a back-cell pixel. The front-cell pixels in the group are related in position to the back-cell, and cooperatively form an area that is larger than and overlaps an area of the back-cell pixel.

11 Claims, 7 Drawing Sheets

DYNAMIC IMAGE SPLIT METHOD FOR DUAL CELL LIQUID CRYSTAL DISPLAY, AND CIRCUIT IMPLEMENTING THE SAME

FIELD

The disclosure relates to a dual cell liquid crystal display (LCD), and more particularly to a dynamic image split method for a dual cell LCD.

BACKGROUND

Recently, a dual cell structure was proposed for use in LCD televisions. A dual cell LCD includes a front LCD cell that is usually a color cell to display color images, and a back LCD cell that is usually a monochrome cell for local control of light (also referred to as local dimming) provided to the front LCD cell. To display an image on a dual cell LCD, the image is split into a front-cell image and a back-cell image for display by the front LCD cell and the back LCD cell, respectively. When light emitted by a backlight module passes through the back LCD cell and the front LCD cell in sequence and then enters users' eyes, the overlapping front-cell and back-cell images cooperatively form a desired image for presentation to the users. The dual cell structure may achieve local dimming with extremely high resolution and thus has excellent local contrast performance.

However, the dual cell structure may lead to parallax errors when users look at images presented by the dual cell LCD from an angle that is non-perpendicular to the dual cell LCD (hereinafter referred to as "non-perpendicular angle"). Referring to FIG. 1, viewing a pixel of the front LCD cell in a direction (A) (from a perpendicular angle) and in a direction (B) (from a non-perpendicular angle) may make the pixel of the front LCD cell correspond to different pixels of the back LCD cell, which may result in parallax errors. The following two equations may be used to calculate luminance of light outputted through and from a pixel location (x, y) of the front LCD cell of the dual cell LCD respectively in the directions (A) and (B):

$$Ba = B1 \times Lb(x, y) \times Lf(x, y) \quad \text{direction (A)}$$

$$Bb = B1 \times Lb(x+\Delta x, y+\Delta y) + Lf(x, y) \quad \text{direction (B)},$$

where Ba represents luminance of light outputted through and from the pixel of the front LCD cell in the direction (A), Bb represents luminance of light outputted through and from the pixel of the front LCD cell in the direction (B), B1 represents luminance of light provided by a backlight module of the dual cell LCD, Lf represents a transmittance of the front LCD cell, and Lb represents a transmittance of the back LCD cell. A smoother back-cell image (with more gradual, smoother transitions, as opposed to sharp transitions, of color (or grayscale code)) may make $Lb(x, y)$ and $Lb(x+\Delta x, y+\Delta y)$ closer, i.e., a smaller parallax error.

For an ordinary LCD, input pixel data indicates a desired transmittance for each pixel in a form of grayscale. For the dual cell LCD, the front LCD cell and the back LCD cell cooperatively form the desired transmittance, so the input pixel data can be regarded as indicating a desired effective transmittance for each pixel of the front LCD panel. A conventional image split method converts a desired effective transmittance into a first transmittance for a pixel of the back LCD cell (back-cell pixel, such as the pixel ($P_B$) in FIG. I) and a second transmittance for a pixel of the front LCD cell (front-cell pixel) that is aligned with the back-cell pixel (such as the pixel ($P_F$) in FIG. 1) according to:

$$Lb = Blur(F(Lin)); \text{ and}$$

$$Lf = Lin/Lb,$$

where Lb represents the transmittance for the back-cell pixel, Lf represents the transmittance for the front-cell pixel, Lin represents the desired effective transmittance corresponding to the front-cell and back-cell pixels, F represents a predetermined relationship or function (e.g., a square root operation) that maps the desired effective transmittance to a preliminary back-cell pixel transmittance, and Blur represents a function of a smoothing filter. Since the preliminary back-cell pixel transmittance is obtained based only on the corresponding desired effective transmittance, a sharp variation in the desired effective transmittance for those of the front-cell pixels that are close to each other may result in a sharp variation in the preliminary back-cell pixel transmittance for the corresponding back-cell pixels. In such a situation, the smoothing filter must be powerful, or otherwise parallax errors may be readily noticeable to users.

SUMMARY

Therefore, an object of the disclosure is to provide a dynamic image split method that can obtain a smoother back-cell image in comparison to the conventional image split method.

According to the disclosure, the dynamic image split method is provided for a dual cell LCD that includes a front LCD cell, and a back LCD cell having a front surface attached to a rear surface of the front LCD cell. The front LCD cell includes a plurality of front-cell pixels used to present an image. Each of the front-cell pixels corresponds to desired effective transmittance for presenting the image. The back LCD cell includes a plurality of back-cell pixels to perform local dimming for the image presented on the front LCD cell. The dynamic image split method includes: for each of the back-cell pixels, determining a transmittance based on background transmittances, which are defined as the desired effective transmittances that correspond to a group of the front-cell pixels related in position to the back-cell pixel, wherein an area cooperatively formed by the group of the front-cell pixels is larger than an area of the back-cell pixel, and overlaps the area of the back-cell pixel in a front-back direction perpendicular to the front surface of the back LCD cell and the rear surface of the front LCD cell; and for each of the front-cell pixels, determining a transmittance based on i) the desired effective transmittance corresponding to the front-cell pixel, and ii) the transmittance determined for one of the back-cell pixels that is aligned with the front-cell pixel in the front-back direction.

Another object of this disclosure is to provide a circuit that implements the dynamic image split method.

According to the disclosure, the circuit includes a transmittance mapping circuit, a weight determining circuit, a weighting circuit, and a transmittance determining circuit. The transmittance mapping circuit is disposed to, for each of the back-cell pixels, receive a representative pixel transmittance, and is configured to map the representative pixel transmittance to a first transmittance value according to a predetermined first relationship, and to map the representative pixel transmittance to second transmittance value according to a predetermined second relationship. The representative pixel transmittance is related to the desired effective transmittance that corresponds to one of the front-cell pixels which is aligned with the back-cell pixel in a front-back direction perpendicular to the front surface of the back LCD cell and the rear surface of the front LCD cell.

The weight determining circuit is disposed to receive a representative background transmittance value for the back-cell pixel, and is configured to obtain a first weight value and a second weight value based on the representative background transmittance value. The representative background transmittance value is related to the desired effective transmittances that correspond to a group of the front-cell pixels related in position to the back-cell pixel. An area cooperatively formed by the group of the front-cell pixels is larger than an area of the back-cell pixel, and overlaps the area of the back-cell pixel in the front-back direction. The weighting circuit is coupled to the transmittance mapping circuit for receiving the first and second transmittance values therefrom, is coupled to the weight determining circuit for receiving the first and second weight values therefrom, and is configured to use the first weight value to weight the first transmittance value and use the second weight value to weight the second transmittance value. The transmittance determining circuit is coupled to the weighting circuit for receiving the first and second transmittance values thus weighted therefrom, and is configured to determine a transmittance for the back-cell pixel based on the first and second transmittance values thus weighted, and to, for each of the front-cell pixels, determine a transmittance based on i) the desired effective transmittance corresponding to the front-cell pixel, and ii) the transmittance determined for one of the back-cell pixels that is aligned with the front-cell pixel in the front-back direction.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
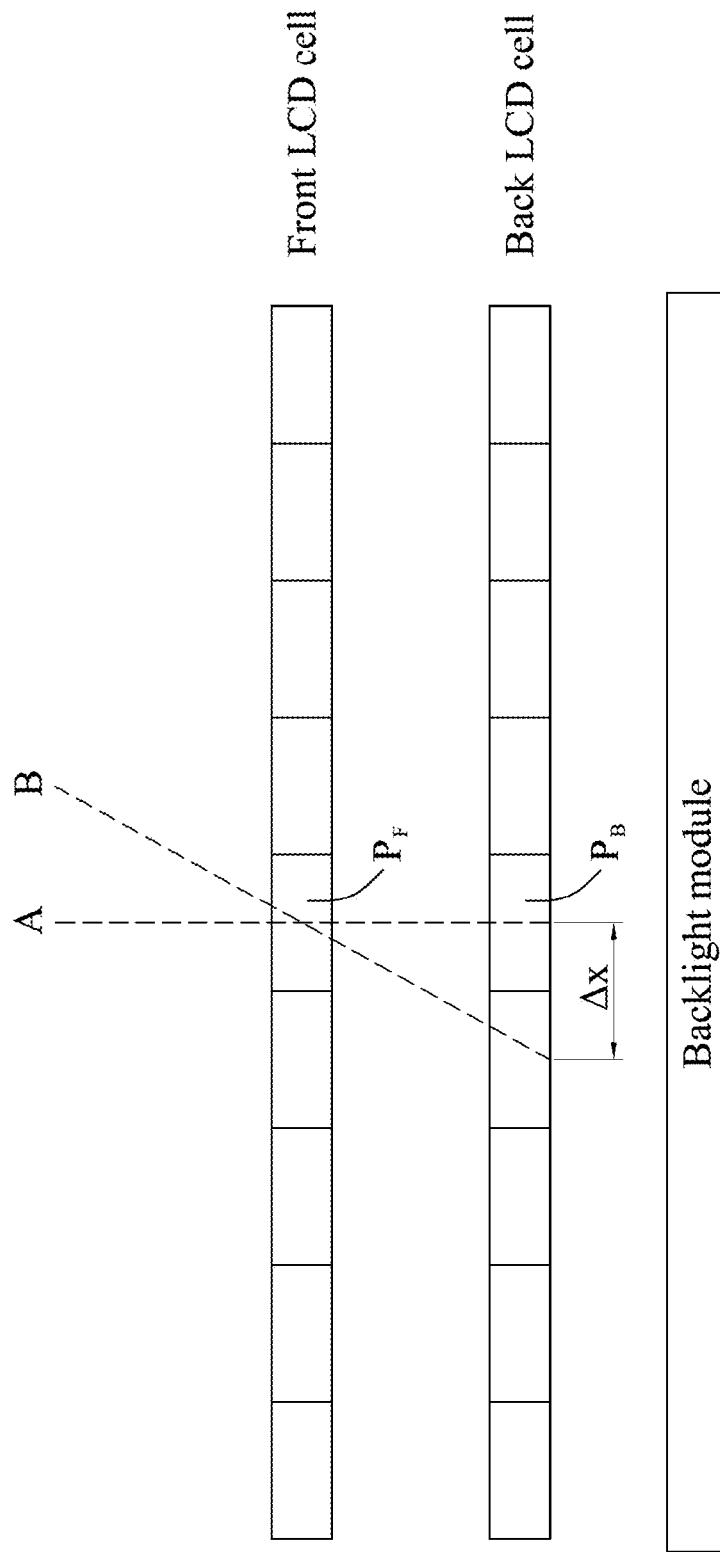
FIG. 1 is a schematic diagram illustrating occurrence of a parallax error.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
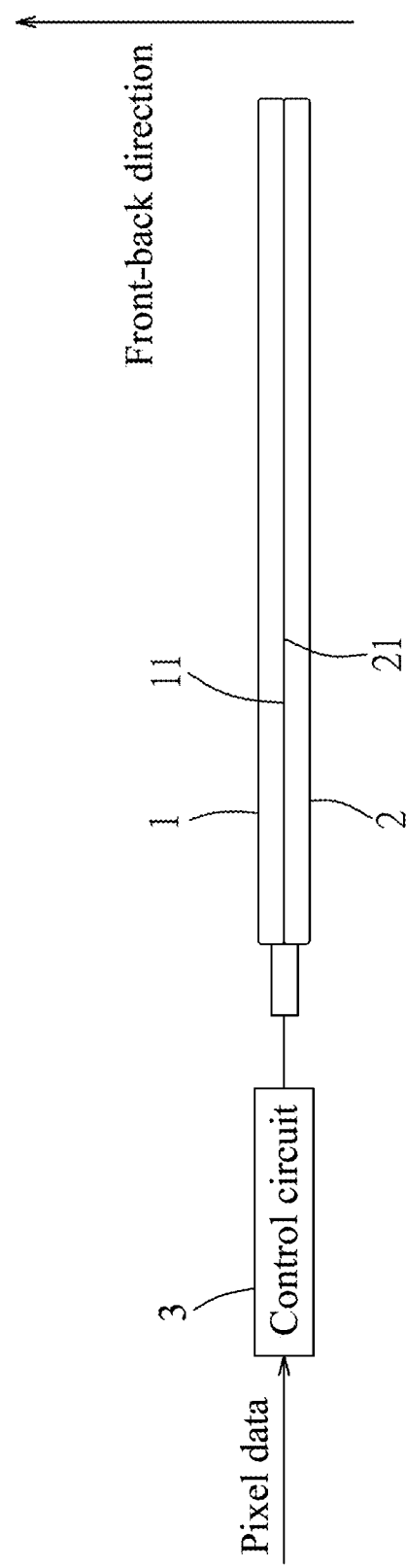
FIG. 2 is a schematic diagram illustrating a structure of a dual cell LCD.

FIG. 2 exemplary illustrates a dual cell LCD that includes a front LCD cell 1, a back LCD cell 2, and a control circuit 3 coupled to the front LCD cell 1 and the back LCD cell 2.

The back LCD cell 2 has a front surface 21 attached to a rear surface 11 of the front LCD cell 1. The front LCD cell 1 includes a plurality of front-cell pixels used to present images; for each image, each of the front-cell pixels corresponds to a desired effective transmittance. The back LCD cell 2 includes a plurality of back-cell pixels to perform local dimming for the images presented on the front LCD cell 1. The control circuit 3 receives pixel data (e.g., grayscale values that represent the desired effective transmittance corresponding to the front-cell pixels) resulting from, for example, a picture engine of a television or a graphical processing unit (GPU) of a computer, but this disclosure is not limited in this respect. The control circuit 3 calculates, based on the pixel data, a back-cell luminance code (e.g., a grayscale value) for each of the back-cell pixels, and a front-cell luminance code (e.g., a grayscale value) for each of the front-cell pixels, where the back-cell luminance code represents a transmittance of the back-cell pixel, and the front-cell luminance code represents a transmittance of the front-cell pixel.

The control circuit 3 implements an embodiment of a dynamic image split method for a dual cell LCD according to this disclosure. In this embodiment, the control circuit 3 determines a transmittance for each of the back-cell pixels based on background transmittances, and determines a transmittance for each of the front-cell pixels based on i) the corresponding desired effective transmittance, and ii) the transmittance determined for one of the back-cell pixels that is aligned with the front-cell pixel in a front-back direction perpendicular to the front surface 21 of the back LCD cell 2 and the rear surface 11 of the front LCD cell 1. It is noted that, for each of the back-cell pixels, the background transmittances are defined as the desired effective transmittances that correspond to a group of the front-cell pixels related in position to the back-cell pixel, wherein an area cooperatively formed by the group of the front-cell pixels is larger than an area of the back-cell pixel, and overlaps, at least in part, (or preferably, completely covers) the area of the back-cell pixel in the front-back direction. In one example, for a back-cell pixel, the background transmittances can be the desired effective transmittances that respectively correspond to a group of front-cell pixels which cooperatively form a front pixel array (e.g., an 11×11 front pixel array). The front pixel array includes the front-cell pixel(s) that is(are) aligned with the back-cell pixel in the front-back direction (preferably being located at the center of the 11×11 front pixel array), and an area of the front pixel array is larger than the area of the back-cell pixel. The term "background" is used to indicate inclusion of those front-cell pixels that are located in a vicinity of the front-cell pixel(s) directly aligned with the back-cell pixel in the front-back direction.

Figure 3:
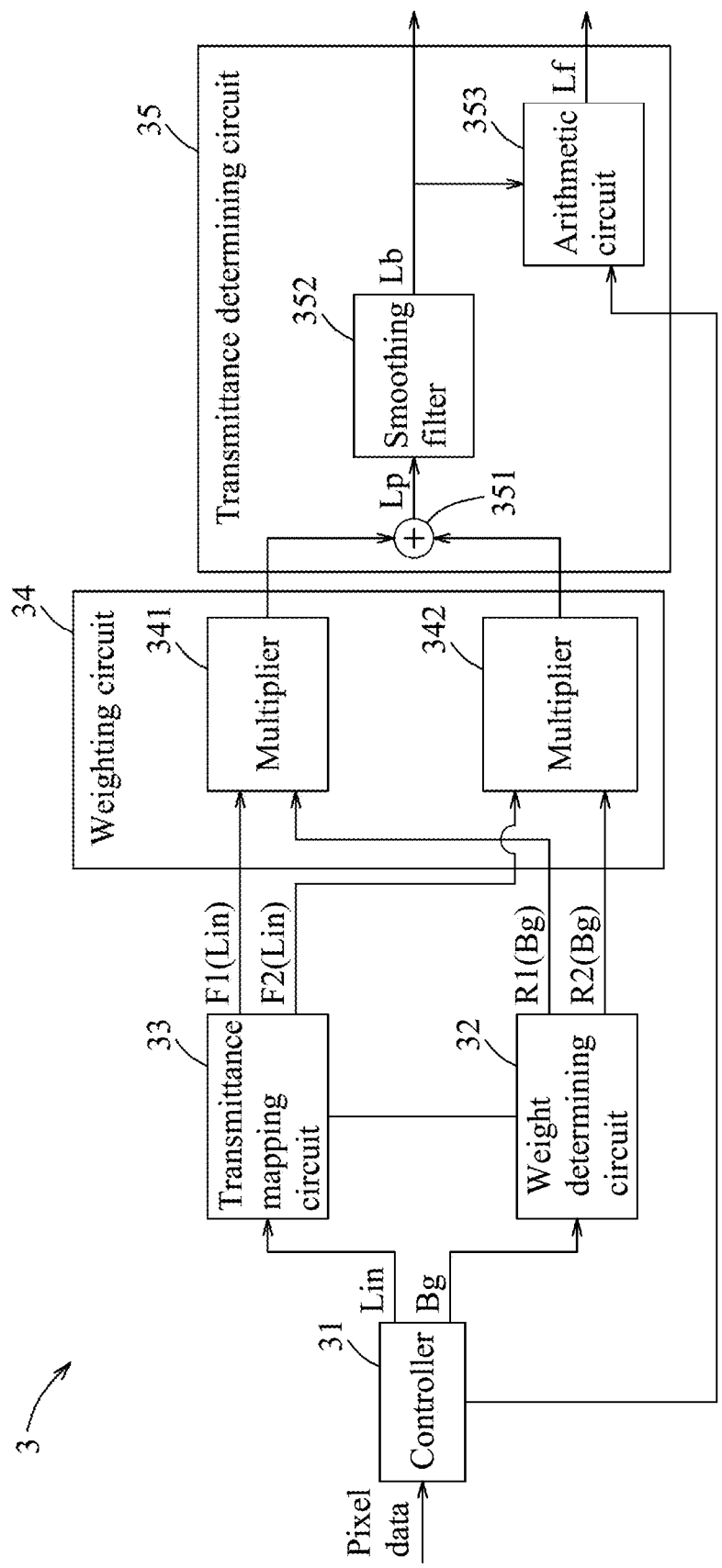
FIG. 3 is a schematic diagram illustrating an embodiment of a control circuit to implement an embodiment of a dynamic image split method according to this disclosure.

FIG. 3 illustrates a possible structure of the control circuit 3 to exemplarily describe operation of the control circuit 3, but this disclosure not limited in this respect. The control circuit 3 exemplarily includes a controller 31 (e.g., a timing controller of the dual cell LCD), a weight determining circuit 32 coupled to the controller 31, a transmittance mapping circuit 33 coupled to the controller 31, a weighting circuit 34 coupled to the weight determining circuit 32 and the transmittance mapping circuit 33, and a transmittance determining circuit 35 coupled to the weighting circuit 34.

Figure 4:
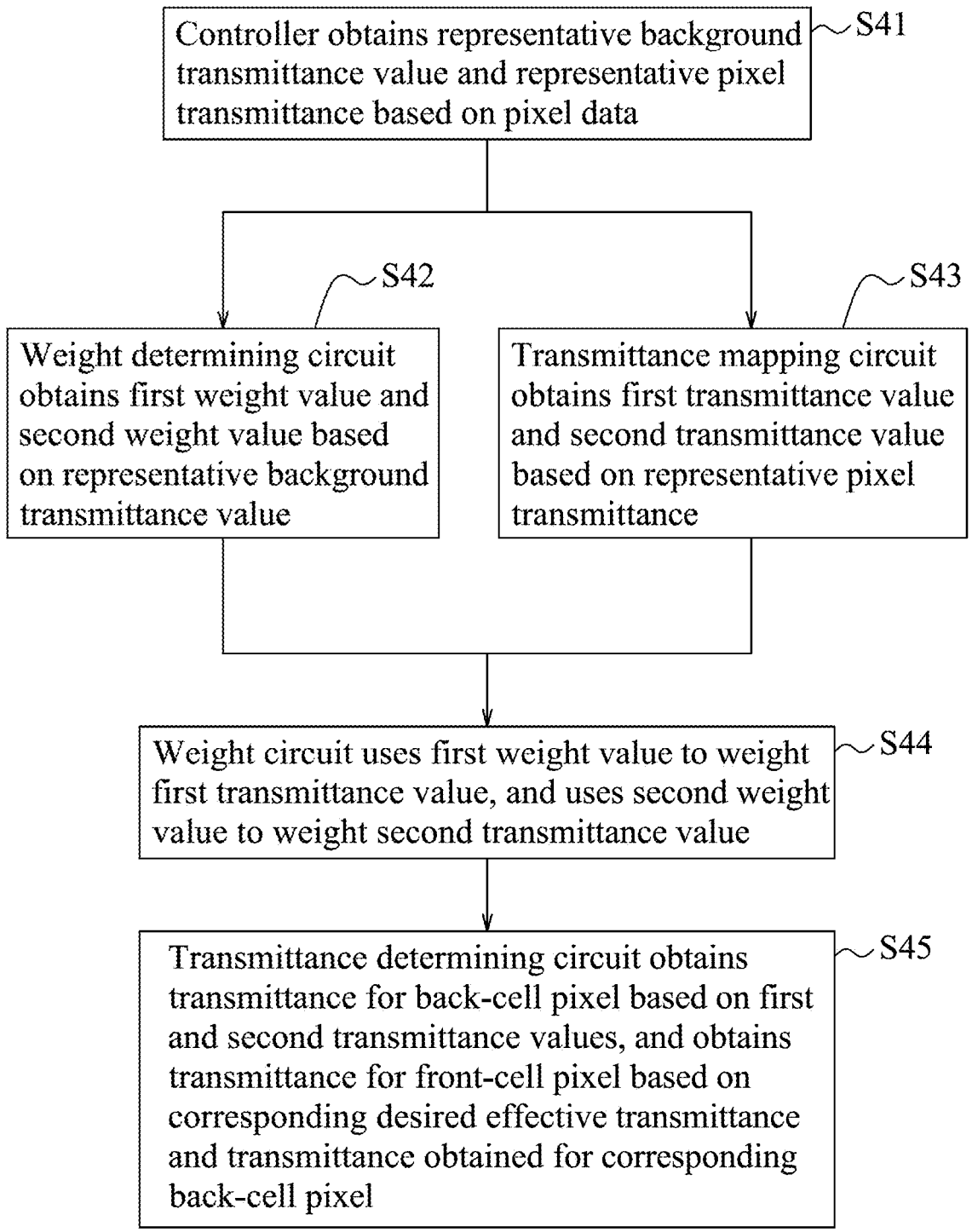
FIG. 4 is a flow chart illustrating steps of the embodiment of the dynamic image split method.

FIG. 4 cooperates with FIG. 3 to exemplarily illustrate steps of the embodiment of the dynamic image split method, but it is noted that the steps of the embodiment of the dynamic image split method are not limited to be implemented by the exemplary circuit structure as shown in FIG. 3. In other embodiments, the steps of the embodiment of the dynamic image split method may be implemented by a circuit with a different architecture, or by a circuit in combination with a properly designed firmware and/or software, and this disclosure is not limited in this respect.

In step S41, the controller 31 that receives the pixel data obtains, for each of the back-cell pixels, a representative background transmittance value based on the background transmittances corresponding to the back-cell pixel. In one example, the representative background transmittance value maybe, for example, an average or a mode of the desired effective transmittances that correspond to the front-cell pixels in the abovementioned front pixel array, but this disclosure is not limited in this respect and the representative background transmittance value may be obtained in a more complicated way. For example, outliers of the corresponding desired effective transmittances or some of the corresponding desired effective transmittances that do not fall within a predetermined range may be excluded from the computation of the representative background transmittance value. In some examples, the representative background transmittance value may be obtained by performing filtering on the background transmittances using a filter, such as a low pass filter, a smoothing filter, an edge preserving filter, etc..

Figure 5:
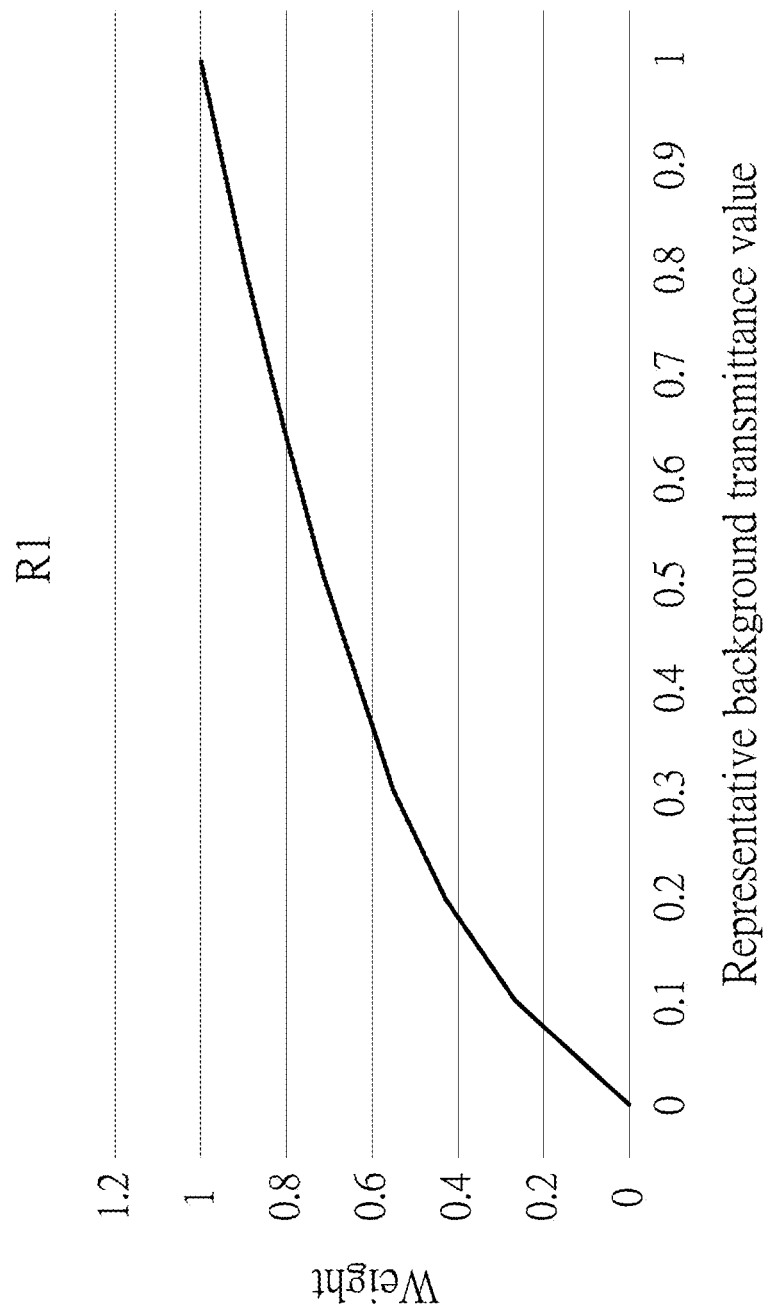
FIG. 5 is a plot exemplarily illustrating a relationship that maps a representative background transmittance value to a first weight value.

In step S41, the controller 31 further obtains, for each of the back-cell pixels, a representative pixel transmittance based on at least the desired effective transmittance that corresponds to one of the front-cell pixels which is aligned with the back-cell pixel in the front-back direction. For example, in a case that the back-cell pixels and the front-cell pixels have a one-to-one relationship (e.g., that the back LCD cell 2 and the front LCD cell 1 have the same resolution, e.g., both are FHDs, so each back-cell pixel is aligned with a respective front-cell pixel in the front-back direction), the representative pixel transmittance can be the desired effective transmittance that corresponds to the front-cell pixel which is aligned with the back-cell pixel. In a case that the back-cell pixels and the front-cell pixels have a one-to-many relationship (e.g., that the back LCD cell 2 and the front LCD cell 1 have different resolutions, e.g., the back LCD cell 2 is FHD and the front LCD cell 1 is 4K, so each back-cell pixel is aligned with four front-cell pixels), the representative pixel transmittance can be, for instance, an average or a maximum of the desired effective transmittances that correspond to multiple front-cell pixels which are aligned with the back-cell pixel in the front-back direction, but this disclosure is not limited in this respect. In step S42, the weight determining circuit 32 that receives the representative background transmittance from the controller 31 obtains a first weight value and a second weight value based on the representative background transmittance value. In other words, for each of the back-cell pixels, the weight determining circuit 32 obtains a first weight value and a second weight value based on the representative background transmittance value corresponding to the back-cell pixel. In this embodiment, the first weight value is monotonically increasing with respect to the representative background transmittance value (i.e., a greater representative background transmittance value corresponds only to the same or a greater first weight value), and the second weight value is monotonically decreasing with respect to the representative background transmittance value (i.e., a greater representative background transmittance value corresponds only to the same or a smaller second weight value). In this embodiment, each of the first weight value and the second weight value ranges from 0 to 1, and a sum of the first and second weight values is 1, but this disclosure is noted limited in this respect. FIG. 5 exemplarily shows a relationship that maps the representative background transmittance value to the first weight value, and the second weight value can be obtained according to R2(Bg)=1−R1(Bg), where Bg represents the representative background transmittance value, R1 represents a relationship that maps the representative background transmittance value to the first weight value, and R2 represents a relationship that maps the representative background transmittance value to the second weight value. In one implementation, the weight determining circuit 32 may include a storage module (e.g., flash memory, a DRAM module, an SRAM module, etc.) that receives the representative background transmittance value, and that stores a lookup table recording one of the relationship (R1) and the relationship (R2) to map the representative background transmittance value to the corresponding one of the first and second weight values, and a circuit (e.g., a subtractor circuit) to obtain the other one of the first and second weight values based on said one of the first and second weight values provided by the lookup table. In one implementation, the weight determining circuit 32 may include two lookup tables that respectively record the relationships (R1, R2) to directly map the representative background transmittance value to the first and second weight values, respectively.

Figure 6:
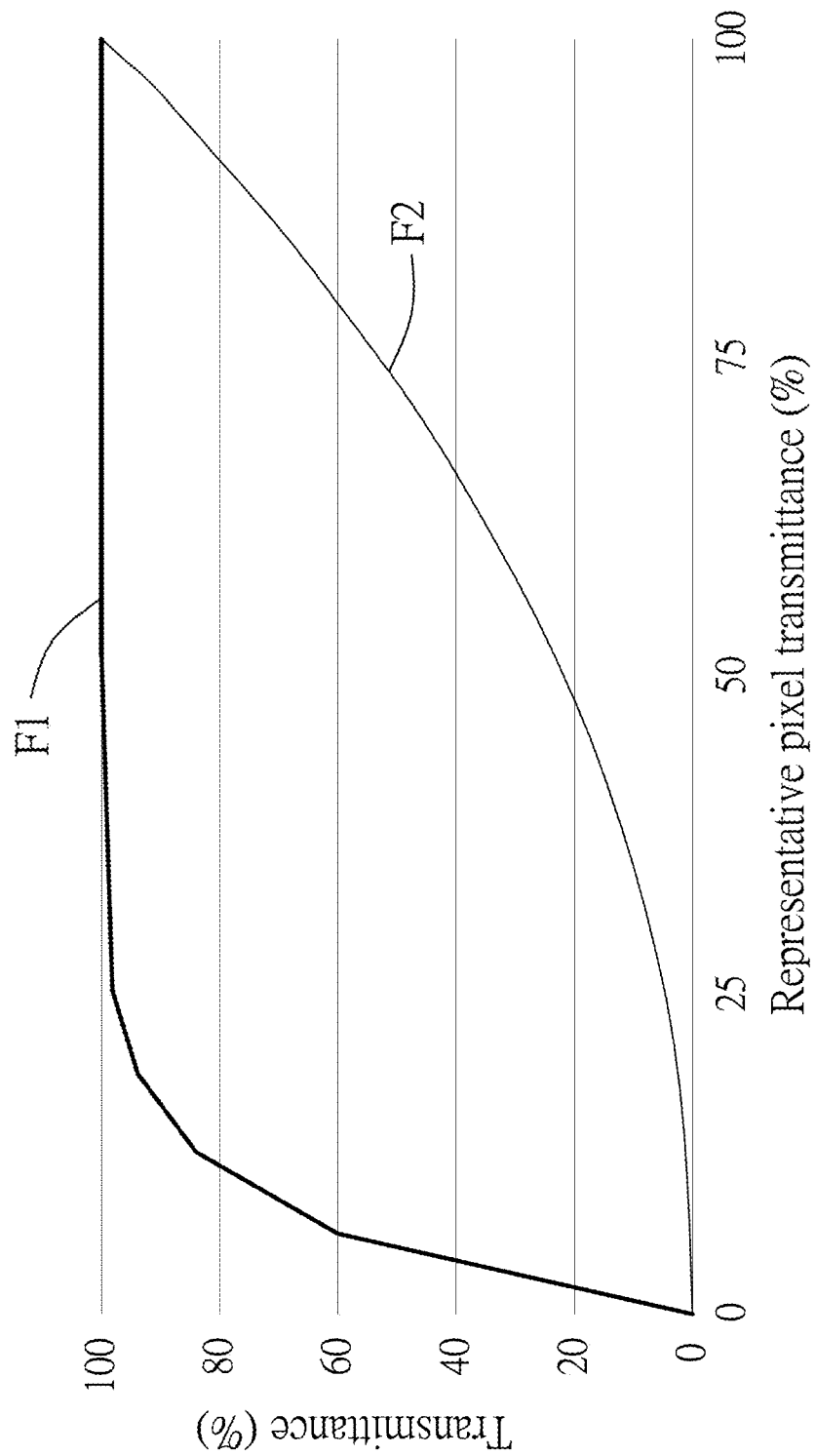
FIG. 6 is a plot exemplarily illustrating a predetermined first relationship and a predetermined second relationship that cooperatively map a representative pixel transmittance to a preliminary transmittance value.

In step S43, the transmittance mapping circuit 33 that receives the representative pixel transmittance from the controller 31 obtains a first transmittance value based on a predetermined first relationship that maps the representative pixel transmittance to the first transmittance value, and obtains a second transmittance value based on a predetermined second relationship that maps the representative pixel transmittance to the second transmittance value. In other words, for each of the back-cell pixels, the transmittance mapping circuit 33 obtains a first transmittance value and a second transmittance value based on the representative background transmittance value corresponding to the back-cell pixel. In this embodiment, each of the predetermined first and second relationships is a monotonically increasing relationship for mapping the representative pixel transmittance to the corresponding one of the first and second transmittance values. However, the predetermined first relationship is different from the predetermined second relationship, and the first transmittance value is not smaller than the second transmittance value. FIG. 6 illustrates an exemplary predetermined first relationship (F1) and an exemplary predetermined second relationship (F2). In one implementation, the transmittance mapping circuit 33 may include a storage module (e.g., flash memory, a DRAM module, an SRAM module, etc.) that stores two lookup tables respectively corresponding to the predetermined first and second relationships. In some implementations, either the predetermined first relationship or the predetermined second relationship can be represented as a function, and the transmittance mapping circuit 33 can be realized as an arithmetic circuit to perform computation based on the function.

In step S44, the weighting circuit 34 that receives the first weight value and the second weight value from the weight determining circuit 32 and receives the first transmittance value and the second transmittance value from the transmittance mapping circuit 33 uses the first weight value to weight the first transmittance value and uses the second weight value to weight the second transmittance value. In other words, for each of the back-cell pixels, the weighting circuit 34 obtains a weighted first transmittance value and a weighted second transmittance value. In this embodiment, the weighting circuit 34 includes a first multiplier 341 that is coupled to the transmittance mapping circuit 33 and the weight determining circuit 32 for respectively receiving the first transmittance value and the first weight value therefrom, and a second multiplier 342 that is coupled to the transmittance mapping circuit 33 and the weight determining circuit 32 for respectively receiving the second transmittance value and the second weight value therefrom. The first multiplier 341 multiplies the first transmittance value by the first weight value to obtain the weighted first transmittance value, and the second multiplier 342 multiplies the second transmittance value by the second weight value to obtain the weighted second transmittance value.

In step S45, the transmittance determining circuit 35 that receives the weighted first and second transmittance values from the weighting circuit 34 obtains the transmittance for the back-cell pixel based on the weighted first and second transmittance values. In other words, for each of the back-cell pixels, the transmittance determining circuit 35 obtains the corresponding transmittance. In this embodiment, the transmittance determining circuit 35 includes an adder 351 that is coupled to the first and second multipliers 341, 342 for receiving the weighted first and second transmittance values therefrom, a smoothing filter 352 coupled to the adder 351, and an arithmetic circuit 353 coupled to the controller 31 and the smoothing filter 352. The adder 351 adds the weighted first and second transmittance values together to obtain a preliminary transmittance value. In this embodiment, the preliminary transmittance value is calculated according to:

$$Lp=F(Lin, Bg)=F1(Lin)\times R1(Bg)+F2(Lin)+R2(Bg),$$

where Lp is the preliminary transmittance value, which can be represented as the function F, Lin represents the representative pixel transmittance, Bg represents the representative background transmittance value, F1 represents the predetermined first relationship, F2 represents the predetermined second relationship, R1 represents the relationship that maps the representative background transmittance value to the first weight value, and R2 represents the relationship that maps the representative background transmittance value to the second weight value. Considering FIGS. 5 and 6, a mixed use of the predetermined first and second relationships (F1, F2) based on the background transmittances (a factor in addition to the desired effective transmittances) may avoid sharp variations in the preliminary transmittance value for the back-cell pixels (which may occur under the use of a single relationship where only the desired effective transmittances are considered), and thus make the preliminary transmittance values for the back-cell pixels have smooth (as opposed to abrupt) variations.

The smoothing filter 352 performs filtering on the preliminary transmittance values that correspond to all of the back-cell pixels, so as to obtain, for each individual back-cell pixel, the corresponding transmittance. In this embodiment, the transmittance for a back-cell pixel can be represented by:

$$Lb=Blur(F(Lin, Bg)),$$

where Lb represents the transmittance for the back-cell pixel, and Blur represents the filtering performing by the smoothing filter 352. It is noted that the smoothing filter 352 may be omitted in some embodiments, and this disclosure is not limited in this respect.

The arithmetic circuit 353 receives, for each of the front-cell pixels, the corresponding desired effective transmittance and the transmittance for the back-cell pixel that is aligned with the front-cell pixel from the controller 31 and the smoothing filter 352, respectively, and determines the transmittance for the front-cell pixel according to:

$$Lf=Ld/Lb,$$

where Lf represents the transmittance for the front-cell pixel, Ld represents the desired effective transmittance that corresponds to the front-cell pixel, and Lb represents the transmittance for the back-cell pixel that is aligned with the front-cell pixel.

Figure 7:
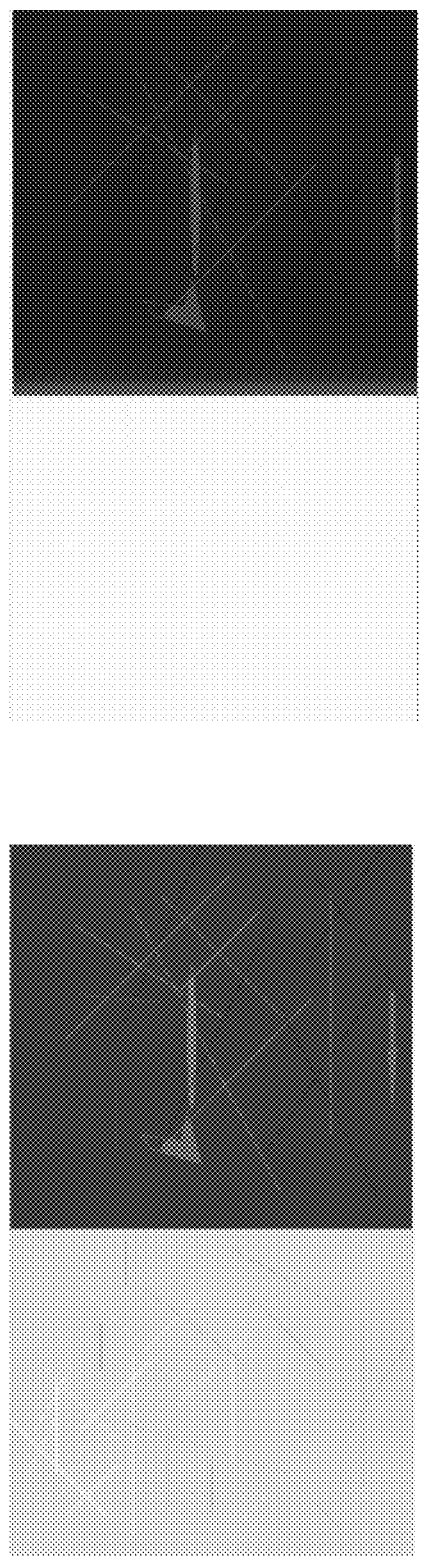
FIG. 7 is a schematic diagram illustrating a comparison between back-cell images obtained by the conventional image split method and the embodiment of the dynamic image split method, respectively.

FIG. 7 shows a comparison between a first back-cell image obtained for a back LCD cell using the abovementioned conventional method, and a second back-cell image obtained for a back LCD cell using the embodiment of the image split method according to this disclosure. It is evident that patterns in the left half of the first back-cell image are hardly visible in the second back-cell image, and the junction of the right half and the left half of the second back-cell image shows a gradual transition in comparison to that of the first back-cell image, proving that the second back-cell image is smoother in terms of variation of luminance.

To sum up, this disclosure takes the background transmittances into consideration when determining the transmittance for each back-cell pixel, thereby making a smoother back-cell image and creating less parallax errors for the dual cell LCD.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A dynamic image split method for a dual cell liquid crystal display (LCD) that includes a front LCD cell, and a back LCD cell having a front surface attached to a rear surface of the front LCD cell, the front LCD cell including a plurality of front-cell pixels used to present an image, each of the front-cell pixels corresponding to a desired effective transmittance for presenting the image, the back LCD cell including a plurality of back-cell pixels to perform local dimming for the images presented on the front LCD cell, said dynamic image split method comprising:

for each of the back-cell pixels, determining a transmittance based on background transmittances, which are defined as the desired effective transmittances that correspond to a group of the front-cell pixels related in position to the back-cell pixel, wherein an area cooperatively formed by the group of the front-cell pixels is larger than an area of the back-cell pixel, and overlaps the area of the back-cell pixel in a front-back direction perpendicular to the front surface of the back LCD cell and the rear surface of the front LCD cell; and for each of the front-cell pixels, determining a transmittance based on i) the desired effective transmittance corresponding to the front-cell pixel, and ii) the transmittance determined for one of the back-cell pixels that is aligned with the front-cell pixel in the front-back direction.

2. The dynamic image split method of claim 1, wherein the determining a transmittance includes:

obtaining a representative background transmittance value based on the background transmittances;

obtaining a first weight value and a second weight value based on the representative background transmittance value, wherein the first weight value is monotonically increasing with respect to the representative background transmittance value, and the second weight value is monotonically decreasing with respect to the representative background transmittance value;

obtaining a first transmittance value based on a predetermined first relationship that maps a representative pixel transmittance to the first transmittance value, and obtaining a second transmittance value based on a predetermined second relationship that maps the representative pixel transmittance to the second transmittance value, wherein the representative pixel transmittance is related to the desired effective transmittance that corresponds to one of the front-cell pixels which is aligned with the back-cell pixel in the front-back direction, the predetermined first relationship is different from the predetermined second relationship, and the first transmittance value is not smaller than the second transmittance value;

using the first weight value to weight the first transmittance value and using the second weight value to weight the second transmittance value; and obtaining the transmittance for the back-cell pixel based on the first and second transmittance values thus weighted.

3. The dynamic image split method of claim 2, wherein the transmittance for the back-cell pixel is obtained based on a preliminary transmittance value that is calculated for the back-cell pixel according to:

$$Lp=F1(Lin) \times R1(Bg)+F2(Lin) \times R2(Bg)$$

wherein Lp represents the preliminary transmittance value, Lin represents the representative pixel transmittance, Bg represents the representative background transmittance value, F1 represents the predetermined first relationship, F2 represents the predetermined second relationship, R1 represents a relationship that maps the representative background transmittance value to the first weight value, and R2 represents a relationship that maps the representative background transmittance value to the second weight value.

4. The dynamic image split method of claim 3, wherein each of the first weight value and the second weight value ranges from 0 to 1, and a sum of the first and second weight values is 1.

5. The dynamic image split method of claim 3, wherein the transmittance for the back-cell pixel is obtained by performing filtering on the preliminary transmittance values that correspond to all of the back-cell pixels using a smoothing filter.

6. The dynamic image split method of claim 2, wherein each of the predetermined first and second relationships is a monotonically increasing relationship for mapping the representative pixel transmittance to the corresponding one of the first and second transmittance values.

7. A circuit to perform a dynamic image split method for a dual cell liquid crystal display (LCD) that includes a front LCD cell, a back LCD cell having a front surface attached to a rear surface of the front LCD cell, and a controller that receives pixel data, the front LCD cell including a plurality of front-cell pixels used to present an image, each of the front-cell pixels corresponding to a desired effective transmittance for presenting the image, the back LCD cell including a plurality of back-cell pixels to perform local dimming for the image presented on the front LCD cell, said circuit comprising:

a transmittance mapping circuit disposed to, for each of the back-cell pixels, receive a representative pixel transmittance, and configured to map the representative pixel transmittance to a first transmittance value according to a predetermined first relationship, and to map the representative pixel transmittance to a second transmittance value according to a predetermined second relationship, wherein the representative pixel transmittance is related to the desired effective transmittance that corresponds to one of the front-cell pixels which is aligned with the back-cell pixel in a front-back direction perpendicular to the front surface of the back LCD cell and the rear surface of the front LCD cell;

a weight determining circuit disposed to receive a representative background transmittance value for the back-cell pixel, and configured to obtain a first weight value and a second weight value based on the representative background transmittance value, wherein the representative background transmittance value is related to the desired effective transmittances that correspond to a group of the front-cell pixels related in position to the back-cell pixel, and wherein an area cooperatively formed by the group of the front-cell pixels is larger than an area of the back-cell pixel, and overlaps the area of the back-cell pixel in the front-back direction;

a weighting circuit coupled to said transmittance mapping circuit for receiving the first and second transmittance values therefrom, coupled to said weight determining circuit for receiving the first and second weight values therefrom, and configured to use the first weight value to weight the first transmittance value and use the second weight value to weight the second transmittance value; and a transmittance determining circuit coupled to said weighting circuit for receiving the first and second transmittance values thus weighted therefrom, and configured to determine a transmittance for the back-cell pixel based on the first and second transmittance values thus weighted, and to, for each of the front-cell pixels, determine a transmittance based on i) the desired effective transmittance corresponding to the front-cell pixel, and ii) the transmittance determined for one of the back-cell pixels that is aligned with the front-cell pixel in the front-back direction.

8. The circuit of claim 7, wherein each of the first weight value and the second weight value ranges from 0 to 1, and a sum of the first and second weight values is 1.

9. The circuit of claim 7, wherein said weighting circuit includes a first multiplier configured to perform multiplication on the first transmittance value and the first weight value to obtain a first product, and a second multiplier configured to perform multiplication on the second transmittance value and the second weight value to obtain a second product; and wherein said transmittance determining circuit includes an adder configured to add the first and second products together to obtain a preliminary transmittance value for the back-cell pixel, and obtains the transmittance for the back-cell pixel based on the preliminary transmittance value.

10. The circuit of claim 9, wherein said transmittance determining circuit further includes a smoothing filter to perform filtering on the preliminary transmittance values that respectively correspond to the back-cell pixel and the other back-cell pixels, so as to obtain the transmittance for the back-cell pixel.

11. The circuit of claim 7, wherein each of the predetermined first and second relationships is a monotonically increasing relationship for mapping the representative pixel transmittance to the corresponding one of the first and second transmittance values.

* * * * *